(12) United States Patent
Suzuki

(10) Patent No.: US 8,293,332 B2
(45) Date of Patent: Oct. 23, 2012

(54) RUST-PROOF PAINT COMPOSITION AND METHOD OF MANUFACTURING A MEMBER HAVING A RUST-PROOF COATING USING THE RUST-PROOF PAINT COMPOSITION

(75) Inventor: Toshimichi Suzuki, Aichi (JP)

(73) Assignee: Yuken Industry Co., Ltd., Aichi (JP)

( * ) Notice: Subject to any disclaimer, the term of this patent is extended or adjusted under 35 U.S.C. 154(b) by 0 days.

(21) Appl. No.: 13/325,114

(22) Filed: Dec. 14, 2011

(65) Prior Publication Data

US 2012/0141686 A1    Jun. 7, 2012

Related U.S. Application Data

(62) Division of application No. 12/281,173, filed on Feb. 13, 2009, now Pat. No. 8,114,205.

(51) Int. Cl.
*B05D 5/00* (2006.01)
*B05D 1/00* (2006.01)
*B05D 1/02* (2006.01)
*B05D 1/18* (2006.01)
*B05D 3/00* (2006.01)
*B05D 3/02* (2006.01)
*B05D 7/14* (2006.01)
*C09D 5/10* (2006.01)

(52) U.S. Cl. .............. 427/388.1; 106/14.05; 106/14.41; 106/14.44; 427/387; 427/388.2

(58) Field of Classification Search ............... 106/14.05, 106/14.41, 14.44; 427/387, 388.1, 388.2
See application file for complete search history.

(56) References Cited

U.S. PATENT DOCUMENTS

| 3,917,648 | A  | 11/1975 | McLeod |
| 5,322,557 | A  | 6/1994  | Inomata et al. |
| 5,755,866 | A  | 5/1998  | Bayly et al. |
| 7,138,184 | B2 | 11/2006 | Clerici et al. |
| 2007/0134503 | A1 | 6/2007 | Espinosa |

FOREIGN PATENT DOCUMENTS

| EP | 1927635 A2 | 6/2008 |
| JP | 11058599 | 3/1999 |
| JP | 11293200 | 10/1999 |
| JP | 2002115084 | 4/2002 |
| JP | 2004-501233 | 1/2004 |
| JP | 2004359800 | 12/2004 |
| JP | 2006028372 B1 | 2/2006 |
| WO | 0185854 A1 | 11/2001 |
| WO | 03085171 A1 | 10/2003 |

*Primary Examiner* — Anthony J Green
(74) *Attorney, Agent, or Firm* — The Webb Law Firm

(57) ABSTRACT

A rust-proof coating, which does not contain a hazardous metal such as chromium and is able to form a thin coating in which crack generation is inhibited even after a baking treatment at a high temperature, including based on the whole composition, 5 to 40% by weight of an organic silicon compound, 0.05 to 5.0% by weight of an organic titanium compound, 20 to 60% by weight of one or more metal powders selected from the group of zinc powder, zinc alloy powder, and aluminum powder, and 10 to 60% by weight of an organic solvent. A coating having excellent anticorrosive properties can be formed by coating the above-mentioned paint composition followed by heating at a temperature of from 200 to 400 degrees C.

5 Claims, No Drawings

RUST-PROOF PAINT COMPOSITION AND METHOD OF MANUFACTURING A MEMBER HAVING A RUST-PROOF COATING USING THE RUST-PROOF PAINT COMPOSITION

The present patent application is a divisional of, is entitled to, and claims priority under 35 U.S.C. §121 to U.S. patent application Ser. No. 12/281,173, filed on Feb. 13, 2009, now U.S. Pat. No. 8,114,205 B2, which is incorporated herein by reference in its entirety.

FIELD OF THE INVENTION

The present invention relates to a rust-proof paint composition which does not contain a hazardous metal such as chromium, and a method of manufacturing a member having a rust-proof coating using the rust-proof paint composition. More specifically, the present invention relates to a rust-proof paint composition which can form an coating having excellent anticorrosive properties and the coating is thin enough to be applied to a steel plate for press molding used for, for example, a precision apparatus or a vehicle, a method of manufacturing a member having a rust-proof coating using the rust-proof paint composition.

BACKGROUND OF THE INVENTION

An anticorrosive paint mainly containing a zinc powder and chromic acid had been much used as a paint to control corrosion of a member having a metallic surface such as a steel member. This paint has superior storage stability because the paint can keep the zinc powder stable for a long period and because of a passivation effect that hexavalent chromium provides. In addition, a coating formed from a paint having a zinc powder prevents corrosion of a metal substrate such as steel because of the known effect of zinc of providing sacrificial protection. Therefore, the coating exhibits excellent rust-proof properties.

However, there has recently been concern of environmental pollution and health damage to the human body caused by the toxicity of hexavalent chromium, and a movement to impose legal restrictions on hazardous metals such as hexavalent chromium has developed. In accordance with this movement, many industries contemplate not using hazardous metals such as hexavalent chromium at all. Therefore, in the field of rust-proof paints, there is a strong desire to prepare a paint totally free from hazardous metals such as chromium.

Such rust-proof paints which do not contain chromium include paints having a zinc powder and a binder component dispersed or dissolved in a solvent, i.e. zinc-rich paints. The binder component of zinc-rich paints can be categorized as an organic type or an inorganic type. Because an inorganic binder component is superior from the viewpoint of durability, a zinc-rich paint having an inorganic binder component is used for an undercoating agent in heavy-duty coatings, such as for a ship or a bridge.

However, a coating formed from such an inorganic zinc-rich paint has a tendency to have voids therein, and it is difficult to control the thickness of the coating. The following means have been disclosed to overcome such problems.

Patent Document 1 discloses a zinc-rich paint which additionally contains calcium carbonate in the form of whiskers with a major axis of 20 to 30 micrometers. The added whiskers act to prevent from forming cracks in a coating of the paint Patent Document 2 discloses a zinc-rich paint containing an alkyl silicate resin for which the ratio of the weight-average molecular weight to the number average molecular weight is 40 or less, with the morpholine gel time of the paint being at most 60 seconds. It is explained in that document that the phenomenon of elongation of cracks and connection of cracks to voids is inhibited because the curing period of the paint is short.

Patent Document 1: JP1999-293200A
Patent Document 2: JP2004-359800A

Although the means described in the above patent documents are indeed effective for a thick coating formed from a zinc-rich paint, they cannot provide a paint that stably forms a thin coating having a thickness of about 10 micrometers and excellent anticorrosive properties.

Such a thin coating having excellent anticorrosive properties is mainly applied to office equipment, electric appliances, vehicles, and the like. Specifically, it is applied to fasteners such as bolts and nuts; attachments such as clamps and clips; and press molded parts such as plates, housings, hinges, and panels. These members are subject to strong shear stresses during their manufacture and assembly, even though they are manufactured to tight tolerances. Therefore, their coatings must have a high film strength and a high level of adhesive properties.

An effective measure for meeting the above requirement for coatings is a baking treatment at a high temperature. However, when a zinc-rich paint is subjected to baking treatment at about 300 degrees C., an organic silicon compound which functions as a binder component in the paint rapidly shrinks. Therefore, even when the means described in the above-mentioned patent documents are applied, extension of cracks in a coating formed from a zinc-rich paint cannot be stopped, and cracks occasionally extend into the substrate.

Accordingly, it is an important technological goal to provide a rust-proof paint which does not contain a hazardous metal such as chromium and is able to form a thin coating in which crack generation is inhibited even after a baking treatment at a high temperature.

SUMMARY OF THE INVENTION

The object of the present invention is to provide a rust-proof paint composition which solves the above-mentioned problems, and a method of manufacturing a member having a rust-proof coating using the rust-proof paint composition.

According to the invention, the problems are solved by means of a paint composition including a nonaqueous binder and a metal powder, and using a solution including an organic silicon compound and an organic titanium compound as the nonaqueous binder.

According to one aspect of the present invention, a rust-proof paint composition comprises, based on the whole composition, 5 to 40% by weight of an organic silicon compound, 0.05 to 5.0% by weight of an organic titanium compound, 20 to 60% by weight of one or more metal powders selected from the group consisting of zinc powder, zinc alloy powder, and aluminum powder, and 10 to 60% by weight of an organic solvent.

According to another aspect of the present invention, a method of manufacturing a member having a rust-proof coating comprises a coating process to coat the above-mentioned paint composition on a metallic surface of a member and a heating process of heating the coated paint composition at 200 to 400 degrees C. to form a coating.

Preferred aspects of the above-described member, the method of manufacturing the member, the first paint composition, and/or the second paint composition of the present invention are the following (a) to (d):

(a) The organic silicon compound of the above-described first paint composition comprises one or more compounds selected from the group consisting of a tetraalkyl silicate compound having an alkyl functional group having 1 to 3 carbon atoms, and an oligomer thereof.

(b) The organic titanium compound of the above-described first paint composition comprises a compound having a generic formula of Ti(X)4 and an oligomer thereof, where X represents one or more functional groups selected from the group consisting of alkoxy groups having 1 to 4 carbon atoms including methoxy, ethoxy, propoxy, isopropoxy, butoxy, isobutoxy, and tert-butoxy; chelating groups including lactate, triethanolaminate, acetylacetonate, acetoacetate, and ethylacetoacetate; and a hydroxy group.

(c) The metal powder of the above-described first paint composition has a scale-like form.

(d) The surface on which the above-described first coating is formed is a surface of a steel member.

The rust-proof paint composition of the present invention does not include a hazardous metal compound such as chromium, which relieves concern about environmental pollution and health damage to the human body. In addition, as the composition has a long pot life, the composition exhibits excellent operability.

Furthermore, it is possible to form a thin film having a thickness of about 10 micrometers and having an excellent surface condition. Therefore generation of large cracks is inhibited even in a baking treatment at a high temperature. Accordingly an excellent rust-proof coating is easily formed even though the thickness of the coating is thin.

DETAILED DESCRIPTION OF THE PREFERRED EMBODIMENTS

The rust-proof paint composition of the present invention includes an organic silicon compound, an organic titanium compound, a prescribed metal powder, and an organic solvent, and it optionally includes a small amount of additives.

These components, a method of preparing the rust-proof paint composition, and a method of manufacturing a rust-proof coating using the rust-proof paint composition are described below, where "%" in the following description of the rust-proof paint composition means the percentage by weight based on the whole rust-proof paint composition unless otherwise specified.

(1) Organosilane Compound

An organosilane compound and an organic titanium compound are used for a binder component of the rust-proof paint composition of the present invention so that generation of large cracks is inhibited even in a baking treatment at a high temperature.

The organosilane compound comprises one or more compounds selected from the group consisting of an alkoxy silane compound and a hydrolysate compound of the silane compound. The alkoxy silane compound preferably comprises a compound of the generic formula $(X')Si(X'')_3$.

X' represents a functional group selected from the group consisting of a hydroxy group; a lower alkoxy group such as methoxy, ethoxy, and isopropoxy; a lower alkyl group such as methyl, and ethyl; a lower alkenyl group such as vinyl; and a lower alkyl group having a functional group such as gamma-glycidoxypropyl, gamma-metacryloxypropyl, and gamma-mercaptopropyl. Each of the groups X", which may be identical to or different from each other, represents a functional group selected from the group consisting of a hydroxyl group and an alkoxy group such as methoxy, ethoxy, and isopropoxy.

The alkoxy silane compound includes tetramethoxysilane, tetraethoxysilane, methyltrimethoxysilane, ethyltriethoxysilane, vinyltrimethoxysilane, vinyltriethoxysilane, and gamma-glycidoxypropyltrimethoxysilane, but is not limited to these specific examples. Various alkoxy silane compounds marketed as silane coupling agents may be used.

A tetraalkoxy silane compound such as tetramethoxysilane, tetraethoxysilane, and tetrapropoxysilane, or an oligomer of the above-described compound is preferable as the organic silicon compound, and a tetraalkoxy silane compound having 1 to 3 carbon atoms, or an oligomer of the above-described compound is especially preferable. When a condensation reaction of these compounds occurs, a coating having a three-dimensional cross-linked structure is formed, and this coating has an improved film strength. In addition, cracks in the coating do not readily extend because volume shrinkage during condensation is relatively small.

The content of the above-described organic silicon compound is preferably 5 to 40% based on the whole rust-proof paint composition. When the content is less than 5%, there is a tendency for the film strength to decrease. When the content is much lower, obvious voids occur between metal powders, which reduces anticorrosive properties. When the content is excessively more than 40%, there is a tendency for anticorrosive properties to decrease because the content of the metal powder becomes relatively low. In addition, the effect of inhibiting crack extension is deteriorated because the area of overlap between laminated metal powders becomes small. An especially preferable range for the content is 10 to 35%.

(2) Organic Titanium Compound

The rust-proof coating of the present invention contains an organic titanium compound to improve the properties of the combined coating. The organic titanium compound means a compound having the generic formula Ti(X)4 and an oligomer of the above-described compound, each of the groups X, which may be identical to or different from each other, represents a functional group selected from the group consisting of a hydroxyl group, a lower alkoxy group, and a chelating group.

The lower alkoxy group means an alkoxy group having 1 to 6 carbon atoms, preferably 1 to 4 carbon atoms, including methoxy, ethoxy, propoxy, isopropoxy, butoxy, isobutoxy, and tert-butoxy groups.

The chelating group means a functional group derived from an organic compound having the ability to perform chelating, which includes a beta-diketone such as acetylacetone; an alkylcarbonylcabonic acid such as acetoacetic acid and its ester; a hydroxy acid such as lactic acid; and an alkanolamine such as triethanolamine. Specific examples of the chelating group include lactate, ammoniumlactate, triethanolaminate, acetylacetonate, acetoacetate, and ethylacetoacetate.

This organic titanium compound exhibits excellent properties when the content thereof is low as described below. Namely, when a baking treatment at a high temperature is performed on the rust-proof paint composition, the added organic titanium compound works as a hardener or a catalyst and promotes a three-dimensional cross-link reaction of the organic silicon compound. As a result, the cure rate of the binder component increases, and crack extension is inhibited.

A chemical bond between the organic silicon compound and the metal powder, and a chemical bond between the organic silicon compound and a metal at the surface of the substrate are promoted because of the organic titanium compound, and as a result, the strength of each bond is improved.

The content of the organic titanium compound is preferably in the range of 0.05 to 5.0%. When the content is too low, the effect of adding the organic titanium compound becomes insignificant and large cracks extending to the substrate on which the rust-proof coating is formed tend to be formed. As a result, there is a tendency for the anticorrosive properties of the rust-proof coating to deteriorate. When the content is too high, the rust-proof paint composition tends to adsorb ambient moisture and be hydrolyzed. Therefore, there is a tendency for the pot life of the rust-proof coating to become shorter. From the viewpoint of achieving a good balance between prohibition of extension of cracks and a long pot life, a more preferable range for the content of the organic titanium compound is 0.1 to 3.5%. A particularly preferable range is 0.1 to 2%.

(3) Metal Powder

The metal powder included in the rust-proof coating of the present invention comprises one or more materials selected from the group consisting of zinc powder, zinc alloy powder, and aluminum powder, which are conventionally used in a zinc-rich paint. The zinc alloy includes Zn—Ni, Zn—Sn, Zn—Fe, Zn—Al, and Zn—Al—Mg.

The content of the metal powder in the rust-proof paint composition is preferably in the range of 20 to 60% arid more preferably 30 to 50%. When the content is too high, it is difficult to coat the rust-proof paint composition in the form of a thin layer, and the film strength of the rust-proof coating is deteriorated. When the content is too low, cracks tend to extend or the anticorrosive properties of the whole coating are deteriorated.

The metal powder as a component of the rust-proof paint composition preferably has a scale-like form so that the rust-proof coating has excellent anticorrosive properties even when the thickness of the rust-proof coating is thin. The scale-like form gives the metal powders in the rust-proof coating a laminated structure in the thickness direction. This laminated structure inhibits crack extension even when cracks are generated in the rust-proof coating because of shrinkage induced by the condensation of the binder component, and it prevents large cracks that expose the substrate.

It is preferable that the average thickness of the metal powder in a scale-like form be $1/200$ to $1/2$ of the average thickness of the rust-proof coating and that the average length of the major axis {the length of the longest part of the scale-like form) of the metal powder be $1/20$ to ten times the average thickness of the rust-proof coating. In the case, crack generation caused by baking in a heating process described below is stably inhibited even when the thickness of the coated layer varies according to the coating condition of the rust-proof paint composition. A more preferable range for the average thickness of the metal powder is $1/200$ to $1/10$ of the average thickness of the rust-proof coating and a particularly preferable range is $1/200$ to $1/20$ of the average thickness. A more preferable range for the average length of the major axis of the metal powder is $1/10$ to 5 times the average thickness of the rust-proof coating and a particularly preferable range is $2/5$ to two times the average thickness.

When the thickness of the rust-proof coating is around 10 micrometers for instance, the above-described preferable metal powder has an average thickness of the scale-like form of 0.05 to 5 micrometers and an average length of the major axis of 0.5 to 100 micrometers, the above-described more preferable metal powder has an average thickness of the scale-like form of 0.05 to 1 micrometers and an average length of the major axis of 1 to 50 micrometers, and the above-described especially preferable metal powder has an average thickness of the scale-like form of 0.05 to 0.5 micrometers and an average length of the major axis of 4 to 20 micrometers.

When the average thickness of the scale-like form is less than the above-described range, there is a concern that the metal powder will be broken during a mixing operation during the preparation of the rust-proof paint composition. When the metal powder is broken, the scale-like form cannot be retained, and it may be difficult to form the laminated structure. When the thickness is above the above-described range, it is hard to form a structure in which multiple metal powders are stacked in the thickness direction of the rust-proof coating, and there is a tendency for the effect of inhibiting crack extension to be reduced.

When the average length of the major axis of the metal powder is below the above-described range, it is hard to form a structure in which the scale-like metal powders are stacked in the rust-proof coating, and there is a tendency for the effect of inhibiting crack extension to be reduced. When the length is above the above-described range, the distribution of the metal powder in the rust-proof coating may become deficient.

When the metal powder of the rust-proof paint composition comprises different types of metal powders, the ratio of components of the metal powder is not particularly limited. However, it is preferable for the metal powder to contain a zinc powder or a zinc alloy powder when anticorrosive properties are important. Even when it is advantageous to increase the ratio of an aluminum powder from the viewpoint of appearance, it is preferable to contain a zinc powder or a zinc alloy powder from the viewpoint of anticorrosive properties.

(4) Organic Solvent

When the rust-proof paint composition contains an organic solvent during a coating operation, a coating having excellent adhesive properties is obtained. Containing the organic solvent in the rust-proof paint composition also improves dispersivity of all sorts of components which are added to prepare a paint composition. As a result, the homogeneity of the rust-proof paint composition is improved.

The organic solvent preferably includes alcohols such as methanol, ethanol, propanol, isopropanol, butanol, hexanol, methoxybutanol, and methoxymethylbutanol; esters such as acetate esters and propionate esters of the above-described alcohols; glycols such as ethylene glycol, diethylene glycol, triethylene glycol, polyethylene glycol, propylene glycol, dipropylene glycol, and tripropylene glycol; and ethers such as monomethyl ethers, monoethyl ethers, and monobutyl ethers of the above-described glycols. The organic solvent may contain hydrocarbons such as toluene, xylene, a mineral spirit, and a solvent naphtha. These may be used alone or as a mixture of different types of the organic solvents.

The content of the organic solvent may vary according to the operating conditions. However, it is preferable that the content be 10 to 60%, and more preferably 20 to 30%. When the content is outside of the range, it may become difficult to form a thin layer or it may becomes difficult for the metal powder in the rust-proof coating to form a laminate structure, and hence it may become difficult to obtain a desired coating depending on the contents of other components.

(5) Other Additives

The rust-proof paint composition may contain all sorts of additives conventionally used in a paint composition, according to need. Such additives include a thickener, an anti-rust pigment for controlling rust, and colloidal silica microparticles.

The thickener includes an aliphatic amide, polyamide, polyethylene oxide, and hydroxylpropyl cellulose, and an inorganic thickener such as a silicate series compound.

The anti-rust pigment includes zinc phosphate, magnesium phosphate, zinc molybdate, and aluminum phosphomolybdate.

The colloidal silica microparticle is a fine sol silica particle having a particle size of 1 micrometer or less and has an effect of improving the anticorrosive properties and film strength of the rust-proof coating, which is similar to the above-described organic silicon compound. The colloidal silica microparticle includes an organosilica sol, which is a colloidal silica dispersed in an organic solvent (e.g. Snowtex provided by Nissan Chemical Industries, Ltd.), and a fumed silica (gaseous phase silica).

Conventional additives for a paint composition other than the above additives such as a moistening agent and a defoaming agent can be contained in the rust-proof paint composition of the present invention.

The total content of these other additives is preferably in the range of 0.1 to 10%. When the content is less than 0.1%, these additives may not have a positive effect. When the content is more than 10%, the contents of major components such as the metal powder and the binder component become low, and the anticorrosive properties of the rust-proof coating which are basic characteristics may be deteriorated.

Each of the above-described components of the rust-proof paint composition can comprise one or more compounds.

(6) Preparation of the Rust-Proof Paint Composition and Method of Manufacturing the Rust-Proof Coating The rust-proof paint composition is prepared by sufficiently mixing the above-described components in order to disperse the metal powder homogeneously.

The substrate to which the rust-proof coating is applied can be any member as far as it has a metallic surface. The substrate may be a metallic member, or a composite member made of a metallic material and a resin and/or a ceramic material, of which at least a part of the surface is metallic. The substrate may be a nonmetallic member such as a resin member having at least a part of the surface of the member metalized by a process such as a plating treatment. It is preferable for the substrate to include a ferrous material, such as steel. The surface of the steel member may be processed by a treatment which is extensively used for pre-coating treatment in order to improve adhesion and/or anticorrosive properties, such as shot blasting treatment or phospating treatment. The surface of the steel may be processed by electrolytic plating of zinc or a zinc alloy (such as Zn—Sn, Zn—Fe, and Zn—Ni), hot dip galvanizing of zinc or a zinc alloy, or alloying galvanizing (these are generically referred to below as "zinc series plating".). However, because the combined coat of the present invention has an excellent barrier effect, the anticorrosive properties of the member having the combined coat formed on a bare steel surface are as good as the anticorrosive properties of a member having the combined coat formed on the surface of zinc series plating. Therefore, it is advantageous to paint the bare steel surface when productivity is important.

The shape of the member is not limited in the present invention. Taking steel as an example, the rust-proof coating can be applied to members having all sorts of shapes such as that of a steel plate, a steel rod, a steel pipe, a steel beam, a molded steel part, and small parts such as bolts.

Coating the rust-proof paint composition on the substrate may be performed by any conventional means such as roll coating, spraying, brush painting, spin coating, and dipping, which mean is selected based on the shape of the member to be coated. It is preferable to coat the rust-proof paint composition so that the thickness of the rust-proof coating after the heating process is in the range of 2 to 30 micrometers. It is more preferable that the thickness of the rust-proof coating be in the range of 5 to 20 micrometers from the viewpoint of achieving a good balance between anticorrosive properties and adhesive properties or secondary workability, and it is especially preferable that the thickness be in the range of 7 to 15 micrometers. The temperature of the rust-proof paint composition during this coating process is not particularly limited. The process can normally be performed at room temperature.

It is preferable that the heating process (baking) after the coating process be performed at 200 to 400 degrees C. It is especially preferable that the baking be performed at 250 to 350 degrees C. from the viewpoint of proper generation of microcracks. The baking period depends on the thickness of the rust-proof coating. When the thickness is in the range of 2 to 30 micrometers, it is preferable that the period be in the range of 10 to 120 minutes. Because of the heating process, the organic silicon compound condenses while organic titanium compound works as a hardener or a catalyst, and a coating including a quantity of metal powders is formed on the surface of the substrate.

A preheating process may be performed before the heating process. Because of the preheating process, temperature variation of the coated rust-proof paint composition in the successive heating process is reduced, and the possibility of forming a portion where the degree of generation of microcracks is greatly different from other portions is reduced, which contributes to an improvement in anticorrosive properties. Therefore, the preheating process may be effective when it is necessary to improve the quality of the combined coat. It is preferable that the preheating process be performed at 80 to 120 degrees C., and it is especially preferable that the preheating temperature be in the range of 100 to 120 degrees C. The preheating period depends on the thickness of the rust-proof coating. When the thickness is in the range of 2 to 30 micrometers, it is preferable that the period be in the range of 5 to 20 minutes. However, because a member having the combined coat without the preheating process exhibits anticorrosive properties which are comparable to those of the combined coating with the preheating process, it is advantageous to reduce the preheating process when a decrease in workability caused by increasing the preheating process is serious.

EXAMPLE 1

Although the present invention will be concretely described below with respect to examples, the invention should not be considered as being in any way limited to these examples.

A scale-like zinc powder was prepared by the following process: 100 parts by weight of zinc metal powder were dispersed in 200 parts of a mineral spirit, and a small amount of an aliphatic acid was added to form a slurry containing the zinc metal powder, the content of which in the slurry was around 30% by weight. Comminution of the slurry was performed using a bead mill (ZRS, manufactured by Ashizawa Finetech Ltd.), after which the processed slurry was dried under a vacuum, and a scale-like zinc powder was obtained having a median length of the major axis of 10 micrometers and a median thickness of 0.3 micrometers. ALPASTE (average length of 10 micrometers, average thickness of 0.2 micrometers), which is a product of Toyo Aluminium K.K., was used as a scale-like aluminum powder. A granular zinc powder used in Comparative Examples was Zinc powder #1 (sphere-shaped having an average diameter of 5.0 micrometers), which is a product of Sakai Chemical Industry Co., LTD.

Paint compositions A and B having the formulations (part by weight) shown in Table 1 were prepared by mixing each component for three hours with a high-speed stirring machine for paint Each paint composition was coated using a bar coater on a mild steel plate which was degreased and rinsed in advance, and heating at 280 degrees C. for 30 minutes was performed on the steel plate on which the paint composition was coated. A rust-proof coating having a thickness of 10 micrometers was thereby formed.

Details of each of the raw materials of the rust-proof paint composition is as follows:

Ethylpolysilicate: Lithium silicate 40, which is a product of Nissan Chemical Industries, LTD.

Butyl titanate dimer: Orgatics TA-22, which is a product of Matsumoto Fine Chemical Co., LTD.

Titanium ethylacetoacetate: Orgatics TC-750, which is a product of Matsumoto Fine Chemical Co., LTD.

TABLE 1

| | | Example 1 | Example 2 | Example 3 | Comparative Example 1 | Comparative Example 2 |
|---|---|---|---|---|---|---|
| formulation | mineral spirit | 80 | 80 | 80 | — | 80 |
| | ethyleneglycolmonobutylether | 80 | 80 | 80 | — | 80 |
| | butanol | 80 | 80 | 80 | — | 80 |
| | zinc powder (scale-like form) | 400 | 400 | 400 | — | 400 |
| | aluminum powder (scale-like form) | 50 | 40 | 30 | — | 50 |
| | zinc powder (sphere-shaped) | — | — | — | 400 | — |
| | ethylpolysilicate | 350 | 300 | 200 | 100 | 350 |
| | butyl titanate dimer | 10 | — | — | — | — |
| | titanium ethylacetoacetate | — | 5 | 3 | — | — |
| | thickener (fatty acid amide) | 2 | 5 | 3 | — | 2 |
| | water | — | — | — | 5 | — |
| | ethanol | — | — | — | 30 | — |
| baking condition | | 100° C. 10 min. → 300° C. 30 min. | | | 80° C. 120 min. | |
| thickness, μm | | 10 | 10 | 10 | 50 | 10 |
| pot life of paint composition | | | 3 months | | 8 hours | 3 months |
| anticorrosive properties (Salt Spray Test), hr | | 2500 | 2500 | 2000 | 400 | 200 |

In order to evaluate the anticorrosive properties of each of the steel plates having the rust-proof coatings, a salt spray test defined by JIS-Z 2371 was performed and the appearance of each steel plate was investigated every 50 hours. It was checked with the naked eye whether red rust was generated on the plate or not and the period until red rust was generated on at least 1% of the surface of the plate was measured as an evaluation criterion of the anticorrosive properties.

Each of prepared paint compositions was stored at a temperature of 25 degrees C. and a humidity of 65% RH, and the period until he stored composition obviously increased in viscosity due to progress of the gelation of the composition was measured as an evaluation criterion of the pot life.

As shown in Table 1, steel plates having rust-proof coatings formed by the paint compositions of Example 1 to 3, each of which contained organic titanium compound according to the present invention, exhibited excellent anticorrosive properties in spite of the fact that their thickness are 10 micrometers. In contrast, steel plates having rust-proof coatings formed by the paint compositions of Comparative Example 1 and 2, each of which contains only an organic silicon compound, could not withstand a baking treatment at a high temperature and therefore they exhibited anticorrosive properties of 400 hours at most.

The pot life of each of paint compositions according to the present invention was much longer than the pot life of the paint composition of Comparative Example 1 in which water was used as a solvent.

The invention claimed is:

1. A method of manufacturing a member having a rust-proof coating comprising:

a coating process of coating a paint composition on a metallic surface of a member; and a heating process of heating the coated paint composition at 200 to 400 degrees C. to form a rust-proof coating, wherein said paint composition comprises, based on the whole paint composition, 5 to 40% by weight of an organic silicon compound, 0.05 to 2% by weight of an organic titanium compound, 20 to 60% by weight of one or more metal powders selected from the group consisting of zinc powder, zinc alloy powder, and aluminum powder, and 10 to 60% by weight of an organic solvent, wherein said paint composition is a nonaqueous paint composition.

2. The method according to claim 1, wherein the surface on which the rust-proof coating is formed is a surface of a steel member.

3. The method of claim 1, wherein the organic silicon compound comprises one or more compounds selected from the group consisting of a tetraalkyl silicate compound having an alkyl functional group having 1 to 3 carbon atoms and an oligomer thereof.

4. The method of claim 1, wherein the organic titanium compound comprises a compound having a generic formula of $Ti(X)_4$ and an oligomer thereof, where X represents one or more functional groups selected from the group consisting of alkoxy groups having 1 to 4 carbon atoms consisting of methoxy, ethoxy, propoxy, isopropoxy, butoxy, isobutoxy, and tert-butoxy; chelating groups consisting of lactate, triethanolaminate, acetylacetonate, acetoacetate, and ethylacetoacetate; and a hydroxy group.

5. The method of claim 1, wherein the metal powder has a scale form.

* * * * *

UNITED STATES PATENT AND TRADEMARK OFFICE
CERTIFICATE OF CORRECTION

| | | |
|---|---|---|
| PATENT NO. | : 8,293,332 B2 | Page 1 of 1 |
| APPLICATION NO. | : 13/325114 | |
| DATED | : October 23, 2012 | |
| INVENTOR(S) | : Toshimichi Suzuki | |

It is certified that error appears in the above-identified patent and that said Letters Patent is hereby corrected as shown below:

On the title page, Item (62) Related U.S. Application Data, after "Pat. No. 8,114,205" insert
-- which is a 371 of PCT/JP2008/050964 filed on Jan. 24, 2008. --

Column 1, Line 9, after "U.S. Pat. No. 8,114,205 B2" insert -- which is a 371 of PCT/JP2008/050964 filed on Jan. 24, 2008. --

Signed and Sealed this
Twenty-second Day of January, 2013

David J. Kappos
*Director of the United States Patent and Trademark Office*